United States Patent [19]

Jasperson

[11] 4,256,804

[45] Mar. 17, 1981

[54] WATERPROOF COATING COMPOSITION

[76] Inventor: F. Bon Jasperson, 4121 NE. 26 Ave., Ft. Lauderdale, Fla. 33308

[21] Appl. No.: 961,201

[22] Filed: Nov. 16, 1978

Related U.S. Application Data

[60] Division of Ser. No. 854,204, Nov. 23, 1977, Pat. No. 4,146,672, which is a continuation of Ser. No. 747,801, Dec. 6, 1976, abandoned.

[51] Int. Cl.$^3$ .......................... B32B 27/00; E04B 1/64
[52] U.S. Cl. ....................................... 428/332; 52/517; 428/334; 428/339; 428/403; 428/407; 428/500
[58] Field of Search ............... 428/334, 323, 327, 328, 428/207, 332, 402, 407, 403, 480, 500, 213, 522, 339; 52/517

[56] References Cited

U.S. PATENT DOCUMENTS

| | | | |
|---|---|---|---|
| 3,849,357 | 11/1974 | Wolf | 428/447 X |
| 3,878,140 | 4/1975 | Sheppard | 428/522 X |
| 4,001,159 | 1/1977 | Imai et al. | 428/500 X |

*Primary Examiner*—Thomas J. Herbert, Jr.
*Attorney, Agent, or Firm*—Murray and Whisenhunt

[57] ABSTRACT

A waterproof elastic coating composition, and coated substrates, having a dried coating of such composition, is disclosed, wherein the coating is polymer rich, has a pigment volume concentration no greater than 10, an ultimate elongation of at least 250% when measured in the form of a film 7 mils thick and at 90% RH and 78° F., a visco-elastic flow such as to permit a 7 mils thick film which is firmly adhered to a surface to withstand, even over extended periods of time, and without loss of its waterproofing properties, the development of a crack of up to 1 mm. in width in said surface, and a dry and wet adhesion to maintain the film adhesion to said substrate under normal atmospheric conditions. Coatings produced from the composition of the present invention waterproof roofs and walls when applied thereto, to form coatings which are extremely durable and long lasting, and which are quite economical in comparison to the waterproofing coatings of the prior art.

11 Claims, No Drawings

WATERPROOF COATING COMPOSITION

This is a divisional application of Ser. No. 854,204, filed Nov. 23, 1977, now U.S. Pat. No. 4,146,672, which was a continuation of Ser. No. 747,801, filed Dec. 6, 1976, now abandoned.

BACKGROUND OF THE INVENTION

The present invention relates to a composition which in the form of a dried film is waterproof and elastic, and has particular advantages as a coating for roofs and walls.

Certain applications for waterproof coatings have the most stringent properties required for the applications to be successful. These stringent property requirements usually orders of magnitude greater than the property requirements for more conventional coatings, such as conventional house paints. The use of traditional mastic compositions will generally result in an initially waterproof coating. However, the conventional mastic coating has almost no ability to absorb movement of the underlying surface, either by crack development or by shifting of roof tiles or the like, unless applied in relatively heavy thick coatings. In this regard, most mastic coatings will be applied at a total film thickness in the neighborhood of 30 or 40 mils or even more. These coatings are quite difficult to apply to roofs of cement tile or similar structures.

Because of the quite thick coatings which are required for the successful use of conventional mastic coatings, the economics of the coating system are not particularly attractive, even though in some instances relatively cheap starting materials are used. Mastic coatings generally lack the desired degree of adhesion, and have little or no moisture vapor transmission ability. Thus, moisture which may be trapped underneath the coating, or which passes from underneath the roof to the coating-roof interface, is most likely to cause blistering and adhesion failure of the mastic coating. This can rapidly lead to failure of the entire coating.

Furthermore, the high viscosity of the mastic coatings allows little if any penetration into layers of gravel which are commonly found on flat roofs. With the mastic sitting on top of the gravel, little or no adhesion will exist between the coating and the roof underlying the gravel.

The prior art mastic-type roof coatings described hereinabove generally had to be quite thick, due to the relatively low level of physical properties of the mastic composition. Many of these mastic compositions were based upon relatively low cost components, but because of the significant amounts of material required to produce an acceptable waterproof layer, the prior art coatings were not economical. Many leaks in roofs were most difficult to patch with the prior art coating compositions, especially in the case of gravel roofs. In order to insure the best roof patch, it was normally necessary to remove the gravel from the area to be patched, or else to put a coating of mastic over the entire roof.

Acrylic resins of the acrylate and methacrylate type have been used for several decades in conventional house paints, of both the flat and gloss type. Normally the paints will exhibit a pigment volume concentration, or PVC, of at least 18–20, and in the case of flat paints, the PVC may be as high as 50–65 or even higher. Such high levels of pigment generally result in relatively poor extensibility properties of the resulting film. The prior art has been reluctant to utilize acrylic resins at a PVC level below about 20, as the resulting paint generally has poor hiding power, such that it would not be considered a satisfactory paint.

U.S. Pat. No. 3,142,578 is directed to a finish coat for roofs, and is based on an asphalt emulsion, glass fibers, and hogs' hair. The asphalt emulsion has a high solids content, and is used in very high amounts in the final composition, so that the final content of asphalt in the coating may be as high as 60% or so. The patent teaches that the use of hogs' hairs is absolutely necessary in order to obtain an acceptable coating, and that the asphaltic emulsion alone cannot be used as a final sealing coat, as the resultant film checks and pin holes and has other imperfections develop (note column 2, lines 23–26. Various types of asphaltic emulsions can be used, of the nature described at column 5, lines 3–26.

U.S. Pat. No. 3,741,922, discloses aqueous latex paint compositions which are an intimate blend of cellulose esters. U.S. Pat. No. 3,725,328 discloses latex coating compositions adapted for airless spray applications, having pigment volume concentrations in the range between about 45% and about 70%. A number of various types of latexes can be used, including acrylic polymer and copolymer latexes.

U.S. Pat. No. 2,372,108 relates to viscous thixotropic emulsions of acrylate and methacrylate polymers. The polymers are prepared by use of cation-active emulsifying agents, used in a particular manner of polymerizing the corresponding monomeric materials to form the acrylate or methacrylate polymer.

U.S. Pat. No. 3,810,852 discloses thixotropic aqueous dispersions of polymers suitable for use as emulsion paints, wherein the thixotropic agent is a zirconium carbonate complex. U.S. Pat. No. 3,955,997 discloses a semi-solid emulsion coating composition containing a polymeric component, including acrylic resins, a water-soluble organic solvent, a thixotropic material, and a hydrophilic polymer, such as certain cellulose derivatives.

U.S. Pat. No. 3,849,357 discloses pigmented masonry water-repellant compositions, which compositions contain pigment, acrylic polymers, and a silicone resin.

U.S. Pat. No. 3,950,283 discloses the production of multi-colored paint, by admixing two or more differently colored hydroxyethyl cellulose-containing aqueous polymer emulsions, together with a clay dispersion, to form a dispersion wherein the aqueous polymer emulsion particles are the disperse phases in a continuous phase of the clay dispersion.

U.S. Pat. No. 3,505,509 discloses a rubber latex roofing composition. The roofing composition also includes glass fibers, and can contain a surface active agent, an antioxidant, a filling agent, a thickening agent, a wetting agent and a curing agent. Normally the latex constituent is employed in a ratio of 1.2:1 to about 1.5:1 with respect to the glass fiber constituent.

U.S. Pat. No. 3,799,902 discloses a coating composition containing sodium aluminate, and a dispersion of a polymeric latex based on an anionic vinyl-addition polymer, and a water-soluble cationic polymer. The total amount of polymer present in the dispersion is indicated to be within the range of 0.001% to 75% by weight. The coating composition is indicated as suitable for forming films which can be cast on surfaces such as glass or metals, or can be used for coating fibers, or corrosion-resistant coatings.

SUMMARY OF THE INVENTION

The present invention is directed to a composition for applying elastic, waterproof, long-lasting coatings to roofs and walls of buildings. The composition has an ultimate elongation of at least 250%, when measured in the form of a dried film 7 mils thick and at 90% R.H. and 78° F., a visco-elastic flow such as to permit a 7 mil thick film which is firmly adhered to a surface to withstand, without loss of the waterproofing characteristics of the film, the development of a crack of up to 1 millimeter in width in said surface, while maintaining firm adherence to the surface immediately adjacent the crack, even over extended periods of time, up to as much as 10 years in length, and an adhesion, under both wet and dry conditions, when applied to tar, gravel and paper-built roofs, cement tile roofs, plywood roofs and asphalt roofs, such as to prevent the passage of water between the coating and the roof.

The composition is based upon a polymer-rich latex. The composition has a pigment volume concentration (PVC) no greater than 10 and has substantially the maximum possible content of polymer. The polymer latex preferably contains at least 50% by weight of polymer, and the composition contains at least 40% by weight of polymer.

The present invention is based on the discovery that by using resins of a particular nature, especially acrylic resins, which are not generally considered to be particularly economical resins, and by using higher resin contents than previously utilized by the waterproofing paint industry, the physical properties of the resulting coating are unexpectedly increased to the level that such low amounts of the coating are required that the resulting cost of the coating composition, on an applied basis, is most advantageous with respect to the prior art coating compositions acknowledged above. In this regard, it should be appreciated that by applying enough of even a quite marginal waterproofing composition, a coating can generally be obtained which will initially satisfactorily exclude water. However, it will be readily appreciated that it is not practical to apply a coating six feet thick of a marginally acceptable coating composition in order to waterproof the flat roof of a building.

The waterproofing coatings produced in accordance with the present invention will give protection extending up to ten years and more to roofs, if properly applied, and cracks and leaks in existing roofs can be most readily patched with the coating composition of the present invention. Roofs which have been coated with the composition of the present invention may substantially develop cracks therein, but the elastically and adhesion properties of the coating composition of this invention permit the coating itself to withstand cracks of greater than 1 mm. in width, up to 2 mm. in width, and even up to 4 mm. in width, without rupture. This is a significant advance over the properties exhibited by prior art waterproofing compositions.

DETAILED DESCRIPTION OF THE INVENTION

A number of various film-forming latexes can be utilized as the polymer latex of the present compositions. Homopolymers, copolymers and terpolymers can be employed in the present compositions, as will be clear to the art. Ordinarily these latexes are made by emulsion polymerization of ethylenically unsaturated monomers. Suitable emulsions include those of vinyl resins including vinyl acetate, vinyl chloride, vinylidine chloride and the like, and acrylic latexes including polymers and copolymers containing units of acrylic acid, methacrylic acid, their esters and acrylonitrile. Broadly, suitable latexes are latexes containing elastomeric synthetic polymers which are obtainable in stable aqueous latex form, containing at least 50% of the polymer in the latex, and capable of coalescing into a film when applied to a surface at ordinary room conditions, such as, for instance, 75° F. and 25% relative humidity and at one atmosphere total pressure. It is critical that the polymer latex be chosen such that the resulting composition has an ultimate elongation of at least 250% when measured in the form of a dried film 7 mils thick and at 90% R.H. and 78° F. Furthermore, the resulting dried film must be in a form such as to exhibit the desired elastic and adhesive properties to permit a 7 mil thick film which is firmly adhered to a surface to withstand the development of a crack up to 1 mm. in width, preferably up to 2 mm. in width, and more preferably up to 4 mm. in width, in the surface without significant loss of waterproofing properties thereof, even over extended periods of time, including periods of time up to ten years or so. The adhesion of the polymer latex composition should be such that when applied to various types of conventional roofs the dried film will prevent the passage of water between the coating and the roof.

The polymer latex of this invention should tolerate water, hydrophilic protective colloids and thickeners such as water-soluble hydroxyethyl cellulose, carboxymethyl cellulose, sodium caseinate, natural gums such as gum tragacanth, locust bean gum, guar gum, and alkali metal alginates, various surfactants such as anionic surfactants, e.g., sodium dodecylbenzene sulfate and sodium dodecylbenzene sulfonate, and nonionic surfactants such as alkyl phenoxy poly(ethyleneoxy)ethanol having alkyl groups of about 7 to about 12 carbon atoms and the like, arpholytics such as coconut fatty acid amides, coconut fatty acid amide condensates and the like, freeze-thaw recovery agents such as the lower alkylene glycols, alkali-fast colorants such as Hansa yellow dyes, phthalocyanine blues and greens, red or yellow oxide or iron toners and toulidine reds, and the like. The latex coating composition of the present invention may be manufactured with some or all ingredients, i.e. freeze-thaw stabilizers, coalescents, antiforms, and can also include fungicides, other stabilizer-thickeners such as hydroxyethylcellulose, and various other anionic and nonionic surfactants.

The coating composition of the present invention is preferably based on an acrylate polymer latex, wherein the acrylate polymer is a lower alkyl ester, such as a methyl, ethyl or butyl ester, of acrylic and methacrylic acids, and copolymers of such esters with other ethylinically unsaturated copolymerizable monomers which are known to the art to be suitable in the preparation of acrylic polymer latexes, can also be utilized. Suitable comonomers include vinyl acetate, which may be used as a comonomer with, for instance, butyl acrylate in a ratio of 70/30 or smaller of the vinyl acetate to the butyl acrylate. Various cross-linking agents known to the art may be utilized, such as, for instance, trimethylolpropane triacrylate.

It is critical that a polymer be chosen which can be utilized at the maximum possible level in the coating composition, and the minimum amount of polymer in the composition will be about 40% by weight. Preferably, at least about 45% by weight of polymer will be in the aqueous coating composition. Such high resin contents in the coating composition can be obtained by using a latex containing at least 50% by weight of polymer, and preferably the latex contains at least 55% by weight of polymer, more preferably at least 60% by weight of polymer.

The maximum content of polymer in the composition is obtained by using polymer latexes containing the high polymer contents mentioned above, and also by using the minimum amount of other agents, and especially by avoiding the addition of unnecessary amounts of water to the composition A thixotropic thickening agent may be added in the minimum amount to give the desired viscosity, and the minimum amount of coloring agent required to produce a desired level of coloration may be utilized. A coalescing agent may be added for the acrylate polymers in an amount which is the minimum amount to produce the desired coalescence of the polymer.

Normally the amount of non-polymer non-aqueous constituents will be less than 20% by weight, with a strong preference for these additives being less than 15% by weight, especially less than 10% by weight, based on the weight of the final coating composition. By so minimizing the quantity of constituents other than film-forming polymer in the dried film, the resulting film will exhibit the desired flexibility and durability.

The coating composition is normally covered by an acrylic paint or other conventional paint after drying, for tack reduction purposes and also for a more attractive appearance.

The purpose of the coloring agent in the coating composition is to allow the workmen in the field to determine which areas have been covered, and which have not yet been covered, by the coating composition during the application thereof. After the coating composition has dried, any uncoated areas should be readily detectable. In addition, at least in some instances the workmen in the field will be able to obtain a rough idea of the amount of composition which is being applied. Thus, the amount of coloring agent which may be added is only enough to distinguish the freshly applied coating composition from the uncoated substrate. It is critical that the coating composition have a PVC or pigment volume concentration no greater than 10, in order to maintain the high acrylate polymer concentration. Preferably, the PVC of the coating composition will be less than 6, and more preferably if pigment is used the PVC is in the neighborhood of 4.

The coloring agent is preferably a pigment, more preferably titanium dioxide, such as Rutile titanium dioxide. However, other pigments which are chemically inert to the acrylate polymer may be utilized, and dyes may be utilized, although the use of dyes, which are known to have relatively poor ultraviolet resistance, is not preferred. When only dyes are utilized, the PVC may be 0.

For applications to other than gravel roofs and to walls, it is preferred that at least one thickening agent which imparts thixotropic characteristics to the composition be used. Attapulgite clay has been found to be particularly effective, although other thixotropic thickening agents known to the art may be utilized if desired.

When the coating composition is used to coat a gravel roof, normally little or no thickening agent will be utilized, as it is preferred for the coating composition to then be of a very low viscosity, in order to penetrate through the gravel to the surface of the roof. In fact, the coating composition of the present invention will frequently the diluted with water up to 50% by volume, preferably about 20% by volume, for such applications, in order to reduce the hangup of solid components on the gravel.

For other coating applications, however, it is preferred that the coating composition be thickened to the point so that after application little if any flow will occur. Of course, with the thixotropic thickening agents, the coating viscosity will reduce upon the application of shear, so that the coating may be readily applied by conventional techniques. Once the coating is applied to walls or roofs, however, it is preferred that it remain substantially in the place of application, without significant sag or other movement. Within these parameters, those in the art can readily choose appropriate thickening agents, and the appropriate amounts of such thickening agents.

The coalescing agent may be any conventional coalescing agent for acrylate polymers, but a coalescing agent which has been found to be particularly suitable is 2,2,4-trimethyl-1,3-pentanediolmonoisobutyrate. Normally the coalescing agent will be used in an amount of less than 5% by weight, preferably less then 3% by weight, and more preferably about 2.5% by weight.

Some types of film-forming polymers do not require the presence of a coalescing agent under certain conditions, as known to the art, so that it will be readily appreciated that the use of coalescing agents is optional.

In certain instances it may be desired to incorporate fibers, such as asbestos fibers or glass fibers, into the coating composition to increase the tear strength of the thin films of the coating. This approach might be more useful for roofs wherein subsequent crack development of significant magnitude was expected, as the incorporation of the fibers may permit the coatings to resist failure in spite of the development of even wider cracks than the 4 mm. cracks mentioned above.

The coating composition may be sprayed upon roofs and walls, or may be brushed or applied by a roller. Normally, the coating composition will be applied in two coats, to insure full coverage, with the coats cross-lapped to insure full coverage. A total coverage rate of 70 square feet per gallon will result in a coating thickness in the order of 10 mils, which has been found to be quite satisfactory. Normally, the coating composition should not be less than 2–4 mils in thickness, in order to obtain adequate physical properties, resistance to pinholing and the like. There is no real upper limit on the coating thickness, other than limitations imposed by economic considerations and by the maximum design weight which the roof can withstand. Because of economic factors, however, it would be most unusual to have a coating as thick as 50 mils, and it is perferable that the coating be no more than 20 mils in thickness. These thickness ranges do not account for the thickness of coating composition required to patch a crack, of course.

In addition to the critical ingredients set forth above, the coating composition of the present invention will normally have other conventional paint additives therein. For example, the coating composition generally contains one or more wetting agents, dispersants, fungicides, sticking agents, defoamers, and the like. It is helpful to utilize a basic dispersant to disperse the titanium dioxide or other pigment in the coating composition. The presence of a fungicide is particularly recommended in hot, humid climates, although for more northern climatic conditions, the presence of a fungicide will normally still be recommended, in view of the long potential life of the coating composition of this invention. The presence of a sticking agent will assist the composition to adhere to greasy or glassy surfaces, and thus will be helpful for some applications. The presence of a defoamer is particularly useful to avoid foaming problems and the defoamers which may be utilized are conventional.

The coating composition of the present invention has its outstanding utility when used as a waterproofing agent for roofs, but is also useful in waterproofing walls. The surfaces which may be coated with the composition of the present invention include cement tile roofs, gravel roofs, asphalt shingle roofs, wood shingle roofs and walls, tarpaper roofs and walls, cement walls, brick walls, masonry block walls, plywood walls and roofs, and any other exterior or interior building surfaces to which adequate adhesion is obtained. The products which are presently commercially available are generally satisfactory as waterproofing coatings for walls, as long as the wall does not crack. However, the products now available are generally subject to coating failure if a crack of any magnitude develops in the wall. In contrast, the coating produced from the composition of the present invention will stretch and retain its waterproofing ability, even if cracks of 1 mm. in width or greater develop in the coated wall.

The present coating composition is based on the use of a minimum amount of water, commensurate with the production of a stable latex, and also for certain applications with the viscosity reduction of the composition to the point where desired penetration through gravel can be obtained. If too great a dilution with water is used, the shrinkage of the composition during drying will be too great, and the properties of the resulting dried film will be adversely effected.

For almost all other applications, however, to other types of roofs and to walls, the concentrated composition, such as a product of Example 1, having maximum resin content, will be utilized.

When the resin coating is applied to a gravel roof, to penetrate through the gravel to the underlying substrate, in some instances the gravel may have had enough dirt penetrate through it that the resin will basically adhere to a dirt layer, rather than the underlying roof surface. In any event, the polymer must exhibit an adhesion, especially a wet adhesion, such as to adequately resist any tendency to separate from the surface to which it is adhered.

As indicated, it is preferred to utilize a thickening agent in the coating composition of the present invention, with the sole exception of coatings which are to be applied to gravel roofs, and it is quite preferred that at least one of the thickening agents utilized impart thixotropic characteristics to the composition. The ultimate viscosity and the thixotropic nature of the composition will vary, depending upon the particular end use which is contemplated, and also depending upon the particular method of application to the substrate that is contemplated. For instance, a higher thixotropic viscosity can be utilized for spray application than for roller application, thus permitting greater build-up on walls and similar surfaces during spray application.

As mentioned hereinabove, in some instances it may be desirable to incorporate fibrous reinforcement into the coating composition, to increase the physical properties of the dried films. However, when the coating composition is to be applied to gravel roofs, it is definitely preferred that the coating composition contain no fibrous components, as such components would hang up in the gravel layer and thus would not form a significant function in the waterproofing coating formed on the underlying substrate. For most applications it is preferred that the coating composition be in the non-fibrous form—that is, that no fibers or filaments be incorporated therein.

The elasticity of candidate coating compositions may be readily tested by determining the Mar Elasticity Value thereof, using the following procedure. A conventional asbestos cement shingle, such as a shingle ⅛" thick, is liberally coated on a smooth side thereof with a sealer (such as Acryloid B-72, an ethyl methacrylate copolymer produced by Rohm and Haas, having a $T_g$ of 40° C. and a viscosity of 470–770 cps at 25° C. in the form of a 50% toluene solution, dissolved in xylol to a 12% resin content). After 1 hour of drying time, the sealer-coated surface is spray coated in two spray applications with the candidate waterproofing composition to a total film thickness of 7–10 mils, dry basis. The thus coated shingle is permitted to dry under ambient conditions for 7 days.

The asbestos shingle is then broken, from the uncoated side toward the coated side, and the two shingle sections on either side of the crack are moved apart increasingly greater distances, and the film checked for integrity at each such distance. This provides an indication of the initial crack development resistance, or elasticity in use, of the candidate waterproofing composition.

The viscoelastic flow characteristics of the candidate waterproofing composition film are checked by taking similar broken, coated asbestos cement shingles and clamping the two sections in rigid clamps maintained a fixed distance apart, with the film integrity observed over the desired periods of time. A Mar Elasticity Value is the width, in mm., of a crack which the candidate waterproofing composition filler (7 mils thick) can withstand over a period of 1 month or more, without loss of waterproofing characteristics and without significant loss of adhesion to the shingle.

The waterproofing coating composition to the present invention will have a Mar Elasticity Value of at least 1, and preferably at least 2. In some instances the compositions may have a Mar Elasticity Value as high as 4 or even higher. In contrast, a conventional flat latex paint may have a Mar Elasticity Value of 0.25, or even less. Thus, with the high Mar Elasticity Value exhibited by the present coating compositions, the compositions are able to withstand, in the form of dried films, significant crack development in the underlying surface.

An unexpected advantage of the polymer-rich waterproofing coating compositions of the present invention is that the conventional fungicides used therein are much more effective, at a given level of fungicide in the resulting film, than in compositions having conventional PVC values, i.e. PVCs of 20 and greater, and the present compositions are especially much more resistant to fungus attack than flat paints of 50 PVC or more containing corresponding amounts of fungicide. While this observation appears true for any conventional fungicide, it has been found to be of particular advantage with mercuric fungicides, such as phenyl mercuric succinate or phenyl mercuric acetate. Normally the fungicide will be used in the coating composition in an amount of about 1–2 lbs., based on active metal, such as mercury, per 100 gallons of coating composition, although in some instances the fungicide level may be as low as ½ lbs. of active metal per 100 gallons of composition, and there is no technical reason why greater amounts of fungicide cannot be used, but economic considerations generally dictate that no more than 2 or 3 lbs. of fungicide based on active metal will be used per 100 gallons of composition.

An illustration of the greatly increased fungicidal activity which can be obtained will be noted if a coating composition of the present invention is compared to a conventional flat paint having a PVC of perhaps 60, using the same film-forming polymer in the two compositions, and the same type and amount of fungicide therein. The conventional flat paint may be subject to substantial fungus attack after only four months of Southern Florida exposure, whereas the coating of the present invention may show no signs of fungus attack after two years or more of the same exposure.

The art has experimented with the concept of reacting the active fungicide onto the film forming polymer or other coating compositions, and if such attempts are successful, no reason is seen why the same concept could not be used in the coating compositions of the present invention.

EXAMPLES OF THE INVENTION

EXAMPLE 1

A 100 gallon acrylic-rich coating composition was prepared by adding, in order, the following ingredients to a stirred mixing vessel:

Water: 7 gal.
Potassium tripolyphosphate: 60 gms.
AMP-95 amine dispersant (2-amino-1-methyl-propanol, International Minerals and Chemicals): 200 ml.
Attagel-50 thickener (Attapulgite clay, Englehart Industries): 14 lbs.
Titanium dioxide, Rutile type: 25 lbs.
Phoplex AC-64 acrylic latex (60% aqueous dispersion of methyl methacrylate copolymer, Rohm & Mass): 80 gal.

The following ingredients were mixed together in a separate mixing vessel:

Super Adit fungicide (phenylmercuric succinate, Tenneco Chemicals): 18 lbs.
Texanol coalescent agent (2,2,4-trimethyl-1,3-pentane diol monoisobutyrate, Eastman Chemical): 23 lbs.
AMP-95 amine dispersant: 2 lbs.
Water: 5 gal.

After the above ingredients in the second mixing vessel were thoroughly mixed, they were added to the main batch of material in the first mixing vessel. This procedure prevented undue shocking of the system, which would tend to cause precipitation.

Thereafter, to the above mixture the following ingredients were added:

GR-7M sticking agent (a 64% aqueous dispersion of dioctylsodium sulfosuccinate, Rohm & Haas): 29.5 oz.
F-142 defoamer (Tenneco Chemicals): 64 oz.

Thereafter, in a separate mixing container, 270 grams of J12 MS thickener (hydroxypropylmethylcellulose, Dow Chemical) and 64 oz. of water were mixed together, and then added to the stirred main batch.

The acrylic-rich coating composition produced by this example was highly suitable as a waterproofing coating for roofs, especially roofs built up of various layers including gravel. The coating composition could be sprayed on a cement tile roof and the viscosity of the coating composition was such that it would stay in place after application, and would coalesce thereon to form the desired waterproof coating. This coating exhibits excellent adhesion to various substrates, and has a high degree of elasticity, compared to conventional latex paints and other waterproofing coatings for roofs. That is, the coating appeared to have maximum stretch and resiliency, commensurate with coating strength. Thus, the coating could withstand significant crack development in the roof after coating application, up to 2 mm, wide crack development, without resulting in coating failure and water leakage. Excellent adhesion could also be obtained on conventional tar roofs, and the coating composition has excellent penetration of moderately chalky surfaces.

The present coating compositions are suitable for application to below-grade walls, and in particular a test coat has been applied to the inside masonry block wall of a below-ground basement, which previous to such application had exhibited leaks. The application of the coating of Example 1 to form a coating about 10 mils thick appeared to adequately stop the water leaks in the test area. It does appear to be important, for applications wherein the water, or hydrostatic, pressure on the film would tend to push the film away from the substrate to which it is adhered, for adequate keying of the film to occur in the substrate. In other words, a relatively porous masonry block construction substrate would be definitely preferred over a smooth finished poured concrete wall.

With the open pore structure of the substrate, the resin can enter into various pores and intersticies therein, and obtain firm adherence by keying. The dried film will still permit moisture vapor to pass therethrough, and can be finished with a top coat of acrylic or other paint, which can be conventional or textured as desired. Thus, an attractive interior finish can be achieved, while at the same time waterproofing of the walls is accomplished.

EXAMPLE 2

Example 1 was repeated, but the Attagel attapulgite clay was increased to 20 lbs. and the J12MS was increased to 1800 gms. This resulted in a coating composition which had a pasty, barely pourable viscosity which could be thinned upon the application of shearing forces thereto. The thick coating composition of this example was highly suitable for patching cracks in existing walls and roofs, wherein the viscosity was at the stop-flow level.

To repair a roof having wide cracks therein, it is preferred that the cracks be patched with a conventional patching composition, in order to provide structure to support the coating composition of this invention, and then the crack is covered with the composition of this Example 2. Thereafter, the entire roof is preferably covered with the composition of Example 1. After these compositions have dried, it is then preferred to coat the entire roof with a conventional acrylic exterior paint, because of the relatively sticky nature of the dried coating of Example 1, caused by the high resin content.

The above compositions were formulated for use in Southern Florida and may require some modification for use in other areas having different environments, as will be clear to those in the art.

What is claimed is:

1. Process for waterproofing an exterior surface, said process comprising applying to said exterior surface a polymer-rich latex coating composition, said latex coating composition containing at least 40% by weight of film-forming polymer, said polymer selected from the group consisting of acrylic polymers and vinyl polymers, and permitting said latex composition to dry to form a dried residue coating, the dried residue coating being no less than 2–4 mils thick and no greater than about 50 mils thick and containing at least 80% by weight of said film-forming polymer and adhered to said substrate, said latex coating composition having a pigment volume concentration no greater than 10, said dried residue coating having a Mar Elasticity Value of at least 1, and a dry and wet adhesion such as to maintain the film adhesion to said exterior surface under normal atmospheric conditions.

2. Process of claim 1 wherein said exterior surface is a roof of a building.

3. Process of claim 1, wherein said exterior surface is a wall of a building.

4. Process of claim 1, wherein said coating has a Mar Elasticity Value of at least 2.

5. Process of claim 1, wherein said coating has a Mar Elasticity Value of at least 4.

6. Process of claim 1, wherein said latex coating composition contains at least 45% by weight of polymer.

7. Process of claim 1, wherein said polymer is an acrylic polymer which is selected from the group consisting of polymers and copolymers containing units of acrylic acid, methacrylic acid, their esters or acrylonitrile.

8. Process of claim 7, wherein said acrylic polymer is a lower alkyl ester of acrylic acid or methacrylic acid or a copolymer of such esters with other ethylynically unsaturated copolemerizable monomers.

9. Process of claim 1, wherein said polymer is a vinyl polymer which is selected from the group consisting of vinyl acetate polymers, vinyl chloride polymers and vinylidine chloride polymers.

10. Process of claim 9, wherein said vinyl polymer is a vinyl acetate polymer.

11. Process for waterproofing an exterior surface, said process comprising applying to said exterior surface a polymer-rich latex coating composition, said latex coating composition containing at least 40% by weight of film-forming polymer, said polymer selected from the group consisting of acrylic polymers and vinyl polymers, and permitting said latex composition to dry to form a dried residue coating, the dried residue coating being no greater than 50 mils thick and containing at least 80% by weight of said film-forming polymer and adhered to said substrate, said latex coating composition having a pigment volume concentration no greater than 10, said dried residue coating having a Mar Elasticity Value of at least 1, and an ultimate elongation of at least 250% when measured in the form of a film 7 mils thick and at 90% RH and 70° F., and a dry and wet adhesion such as to maintain the film adhesion to said exterior surface under normal atmospheric conditions.

* * * * *